United States Patent
Gan et al.

(10) Patent No.: US 11,226,708 B2
(45) Date of Patent: Jan. 18, 2022

(54) TOUCH ELECTRODE, TOUCH PANEL, AND TOUCH DISPLAY OF USING THE SAME

(71) Applicant: TPK Advanced Solutions Inc., Fujian (CN)

(72) Inventors: Yi-Peng Gan, Xiamen (CN); Cheng-Chieh Li, New Taipei (TW); Qin-Xue Fang, Xiamen (CN); Yong-Bin Ke, Xiamen (CN); Si-Dian Chen, Hengyang (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/206,419

(22) Filed: Mar. 19, 2021

(65) Prior Publication Data
US 2021/0318780 A1    Oct. 14, 2021

(30) Foreign Application Priority Data

Apr. 14, 2020 (CN) .......................... 202010289422.0

(51) Int. Cl.
*G06F 3/044* (2006.01)
(52) U.S. Cl.
CPC .......... *G06F 3/0445* (2019.05); *G06F 3/0446* (2019.05)
(58) Field of Classification Search
CPC .............................. G06F 3/0445; G06F 3/0446
See application file for complete search history.

(56) References Cited

U.S. PATENT DOCUMENTS

| 2015/0022735 A1* | 1/2015 | Hsu | G06F 3/0448 |
| | | | 349/12 |
| 2015/0109231 A1 | 4/2015 | Shirai et al. | |
| 2019/0147212 A1* | 5/2019 | Li | G06K 9/0002 |
| | | | 382/124 |

FOREIGN PATENT DOCUMENTS

| CN | 203414928 U | 1/2014 |
| CN | 104850295 A | 8/2015 |
| CN | 206058156 U | 3/2017 |
| CN | 106775050 A | 5/2017 |
| CN | 108536328 A | 9/2018 |
| TW | M481449 U | 7/2014 |
| TW | 201610796 A | 3/2016 |
| TW | M599945 U | 8/2020 |

* cited by examiner

*Primary Examiner* — Deeprose Subedi
(74) *Attorney, Agent, or Firm* — Cooper Legal Group, LLC

(57) ABSTRACT

A touch electrode is provided in the disclosure, including a first electrode layer and a second electrode layer. The first electrode layer includes a plurality of first electrodes. Each of the first electrodes includes a plurality of first electrode wires and a plurality of first axis wires, in which each of the first axis wires is connected to and perpendicular to the first electrode wires. The second electrode layer is electrically insulated and located above or beneath the first electrode layer. The second electrode layer includes a plurality of second electrodes. Each of the second electrodes includes a plurality of second electrode wires, and the second electrodes are spaced apart from each other and connected to each other in parallel. The material of the first and the second electrode layers is metal nanowires. A touch panel and a touch display, including the touch electrode described herein, are also provided.

19 Claims, 7 Drawing Sheets

TOUCH ELECTRODE, TOUCH PANEL, AND TOUCH DISPLAY OF USING THE SAME

CROSS-REFERENCE TO RELATED APPLICATION

This application claims priority to China Application Serial Number 202010289422.0, filed Apr. 14, 2020, which is herein incorporated by reference in its entirety.

BACKGROUND

Field of Disclosure

The present disclosure is related to a touch electrode, a touch panel, and a touch display. More particularly, the present disclosure is related to a touch electrode with increased stability and application durability.

Description of Related Art

Recently, with the technical development of touch devices, touch electrodes have been widely used in various electronic devices. Because touch screens allow information to be directly input on the screen with fingers or pens, which has a high degree of convenience, touch screens are widely used in various electronic products.

However, in addition to touch detection sensitivity, the design of touch electrodes is further influenced by physical contact and bending during manufacture or the use. Therefore, it is especially necessary to prevent electrode wires from breaking or scratching, which causes an abnormal increase of impedance and poor touch sensitivity. Therefore, how to improve the stability and the application durability of the electrodes is an urgent problem that remains to be solved.

SUMMARY

One embodiment of the present disclosure provides a touch electrode, which uses nano silver wires as materials and a pattern design with parallel axis wires to improve the flexibility of the width design of electrode wires, avoid metal reflection and Moiré effects, and achieve a better stability and durability of wires.

One embodiment of the present disclosure provides a touch electrode, including a first electrode layer and a second electrode layer. A first electrode layer includes a plurality of first electrodes, in which each of the first electrodes includes a plurality of first electrode wires and a plurality of first axis wires, in which the first electrode wires extend along a first direction, are spaced apart from each other along a second direction, and are connected to each other in parallel, in which the first axis wires extend along a second direction and are spaced apart from each other along the first direction, in which each of the first axis wires is connected to the first electrode wires, and in which the first direction and the second direction are perpendicular to each other. The second electrode layer is electrically insulated and located above or beneath the first electrode layer, in which the second electrode layer includes a plurality of second electrodes, in which each of the second electrodes includes a plurality of second electrode wires, in which the second electrode wires extend along the second direction, are spaced apart from each other along the first direction, and are connected to each other in parallel. A material of the first electrode layer and the second electrode layer is metal nanowires, and the first electrode wires and the second electrode wires are strip-shaped electrode wires with a sinusoidal waveform.

In some embodiments, from a projection in a vertical direction of the first electrode layer and the second electrode layer, the first axis wires are oppositely disposed between two adjacent second electrodes of the second electrodes.

In some embodiments, from the projection in the vertical direction of the first electrode layer and the second electrode layer, the first axis wires are oppositely disposed between two adjacent second electrode wires of the second electrode wires.

In some embodiments, each of the first electrodes includes three of the first electrode wires connected to each other in parallel, and each of the second electrodes includes three of the second electrode wires connected to each other in parallel.

In some embodiments, in each of the first electrodes, each of the first axis wires is connected to all or a portion of the first electrode wires connected to each other in parallel.

In some embodiments, wire widths of the first electrode wires and the first axis wires are from 100 μm to 800 μm, and two adjacent first electrode wires of the first electrode wires are separated from each other by 900 μm to 1600 μm.

In some embodiments, each of the second electrodes further comprises a plurality of second axis wires, in which the second axis wires extends along the first direction and are spaced apart from each other along the second direction, in which each of the second axis wires is connected to the second electrode wires.

In some embodiments, from a projection in a vertical direction of the first electrode layer and the second electrode layer, the second axis wires are oppositely disposed between two adjacent first electrodes of the first electrodes.

In some embodiments, from the projection in the vertical direction of the first electrode layer and the second electrode layer, the second axis wires are oppositely disposed between two adjacent first electrode wires of the first electrode wires.

In some embodiments, in each of the second electrodes, each of the second axis wires is connected to all or a portion of the second electrode wires connected to each other in parallel.

In some embodiments, wire widths of the second electrode wires and the second axis wires are from 100 μm to 800 μm, and two adjacent second electrode wires of the second electrode wires are separated from each other by 900 μm to 1600 μm.

In some embodiments, wire widths of a vertical projection area at an intersection of the first electrodes and the second electrodes are less than wire widths of the first electrodes and the second electrodes at non-intersection areas.

A touch panel is provided in another embodiment of the present disclosure, including a first substrate and the aforementioned touch electrode, in which the first electrode layer is disposed on a first surface of the first substrate.

In some embodiments, the second electrode layer is disposed on a second surface of the first substrate opposite to the first surface of the first substrate.

In some embodiments, the touch panel further includes an insulation coating, in which the insulation coating is disposed on the first electrode layer, and the second electrode layer is disposed on the insulation coating.

In some embodiments, the touch panel further includes an adhesive layer and a second substrate, in which the second electrode layer is disposed on a surface of the second substrate, and the first substrate on which the first electrode layer is disposed and the second substrate on which the second electrode layer is disposed are attached to each other by the adhesive layer.

In some embodiments, the touch panel further includes an optical adhesive layer, in which the first substrate is attached to a display module by the optical adhesive layer.

A touch display is provided in another embodiment of the present disclosure, including a display module and the above-mentioned touch electrode, in which the display module includes at least one carrier substrate, and the first electrode layer and the second electrode layer are disposed on the carrier substrate.

In some embodiments, the carrier substrate includes any one of a display substrate, a polarizer, a protective substrate, and an adhesive layer.

BRIEF DESCRIPTION OF THE DRAWINGS

The various aspects of the content of the present disclosure can be best understood from the following detailed description and reading together with the accompanying drawings. It is worth noting that, according to the common practice in the industry, the various features are not drawn to scale. In fact, in order to clearly illustrate, the size of each feature may be arbitrarily increased or decreased.

DETAILED DESCRIPTION

The following disclosure provides many different embodiments, or examples, for implementing different features of the disclosure. Specific examples of components and arrangements are described below to illustrate the present disclosure. These are, of course, merely examples and are not intended to be limiting. The following disclosure provides a detailed description of many different embodiments, or examples, for implementing different features of the provided subject matter. In the following description, many specific details are set forth to provide a more thorough understanding of the present disclosure. It will be apparent, however, to those skilled in the art, that the present disclosure may be practiced without these specific details.

In addition, spatially relative terms, such as "under", "upper", and the like, are used to conveniently describe the relative relationship between one element or one feature and other elements or features in the figures. Spatially relative terms are intended to include different orientations of the device other than the orientation in which the device is used or operated. The device can be positioned separately (for example, rotated by 90 degrees or other orientations), and the spatially relative description used in the disclosure can also be explained accordingly.

As used herein, the singular forms "a", "an", and "the" are intended to include the singular form and the plural forms as well, unless the context clearly indicates otherwise. It will be further understood that the terms "comprises" and/or "comprising", or "includes" and/or "including", or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

A number of examples are provided herein to elaborate upon the touch device of the instant disclosure. However, the examples are for demonstration purpose alone, and the instant disclosure is not limited thereto.

Figure 1:
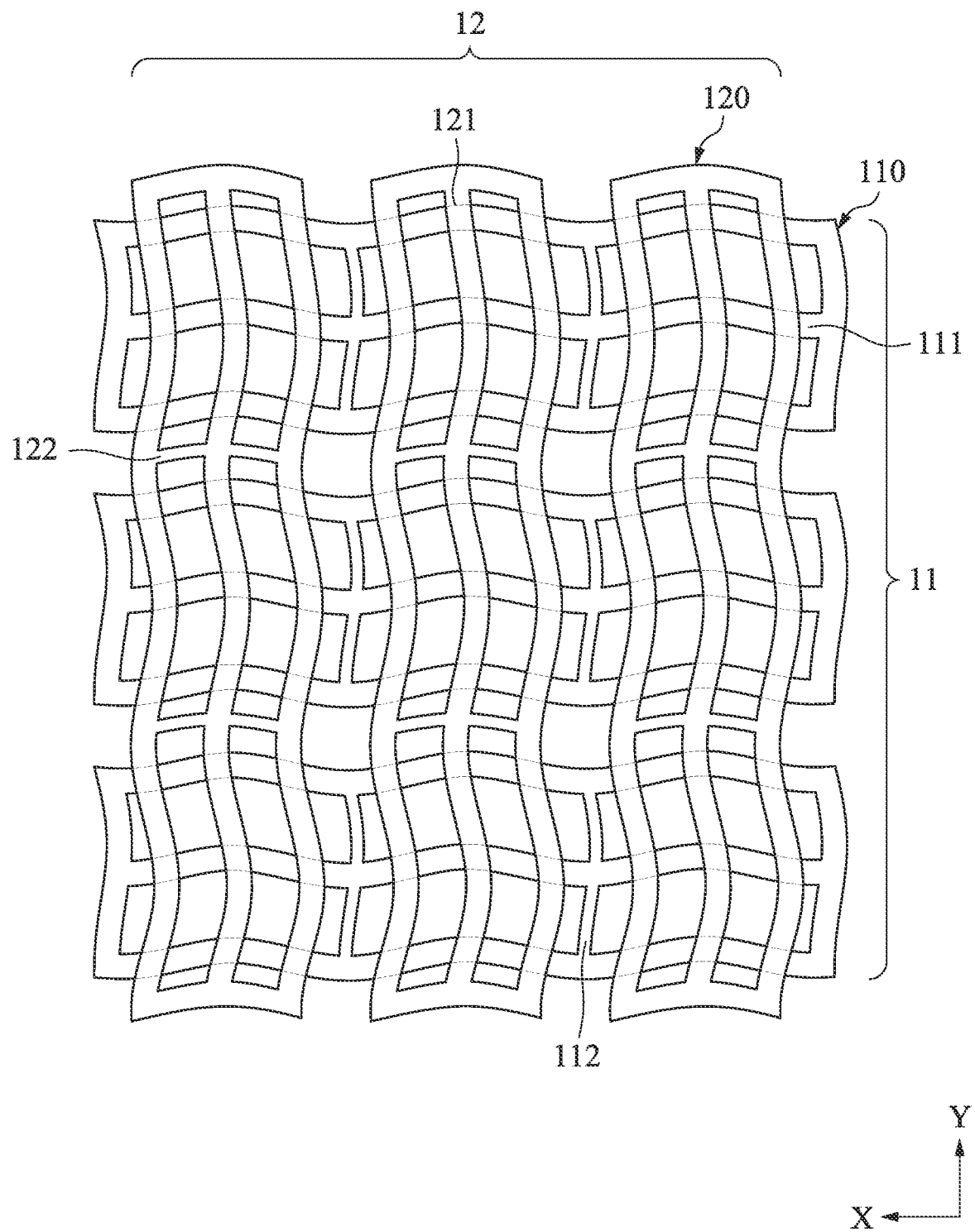
FIG. 1 depicts a front view of a touch electrode according to one embodiment of the present disclosure.

FIG. 1 depicts a front view of a touch electrode 100 according to one embodiment of the present disclosure. The touch electrode 100 of the embodiment is, for example, a structure with a double-layer electrode layer, for example, including a first electrode layer 11 and a second electrode layer 12. In some embodiments, the second electrode layer 12 is electrically insulated and located above or beneath the first electrode layer 11.

In some embodiments, the material of the first electrode layer 11 and the second electrode layer 12 is metal nanowires. It should be emphasized that metal nanowires have the characteristics of low resistance and high light transmittance. Therefore, the reflection and Moiré effects that are desired to be avoided in the conventional use of metal meshes can be avoided, and metal nanowires, with wider wire width, can even be applied in the electrode wires, increasing the flexibility of the wire design.

Furthermore, each electrode in the electrode layer contains a plurality of electrode wires. In order to reduce the visibility of the touch electrodes, improve the bendable ability of the touch electrode and avoid the breaking of the electrode wires by the bending stress, the electrode wires of the present disclosure are preferably designed to be long strip-shaped electrode wires with a sinusoidal waveform, that is, so-called S-shaped electrode wires or wave-shaped electrode wires.

In addition, each electrode in the electrode layer also includes a plurality of axis wires, which are connected to a plurality of electrode wires in parallel in the touch electrode to increase the wire bifurcation between the electrodes wires connected to each other in parallel. It should be emphasized that broken or damaged electrode wires will cause increased circuit impedance and signal attenuation. The design of axis wires in the present disclosure can reduce the increase of the aforementioned circuit impedance and signal attenuation, thereby enhancing the structural integrity of electrodes without affecting the impedance required by the original design and the capacitance performance before and after touch. In addition, it is allowable to design the most suitable range of axis wires according to the impedance change expected to be reduced to through wire modeling (for example sizes and/or the number of electrode wires) without affecting the capacitance. Generally speaking, as the number of axis wires increases, the change in circuit impedance will decrease.

Figure 2A:
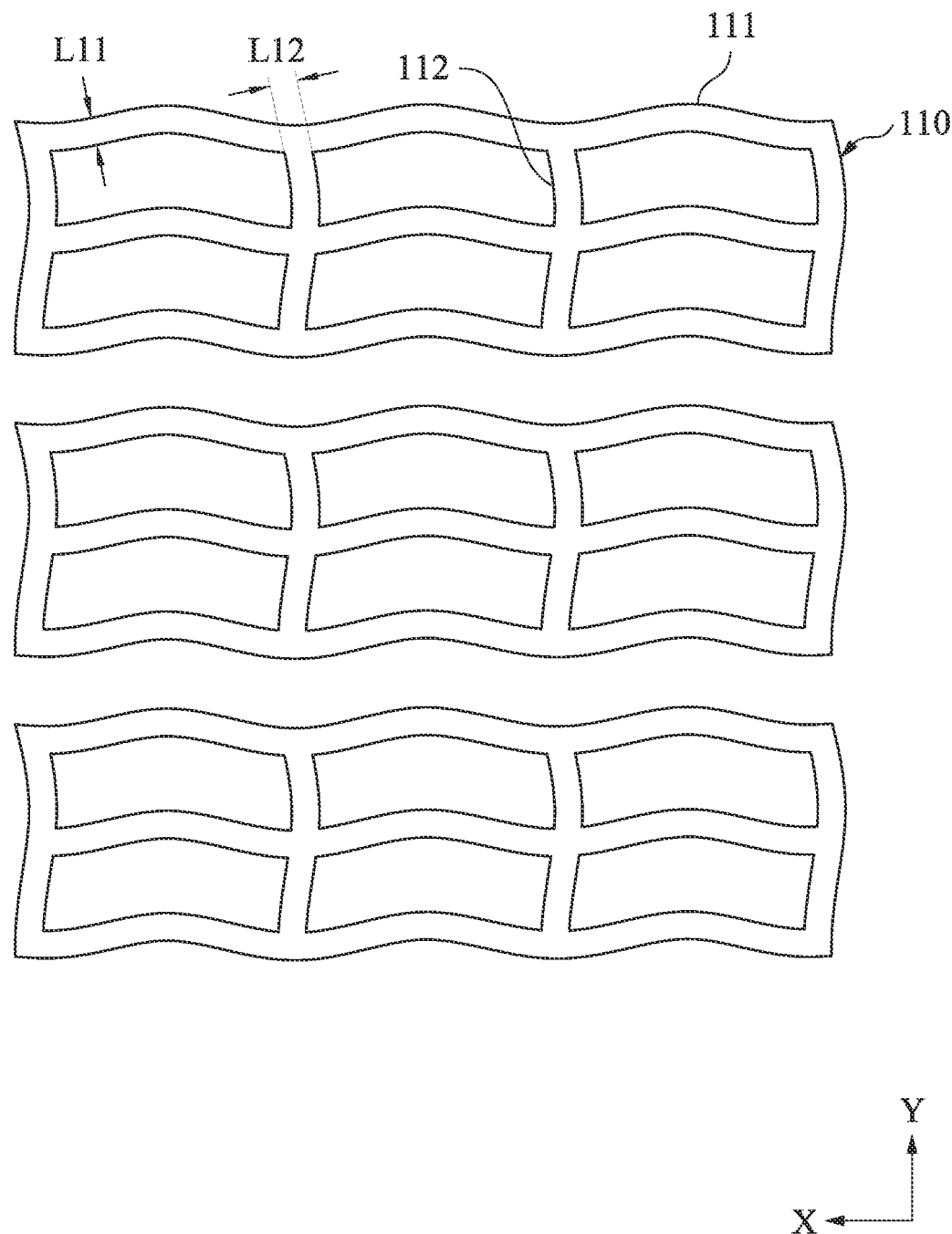
FIG. 2A depicts a schematic view of a first electrode according to one embodiment of the present disclosure.
Figure 2B:
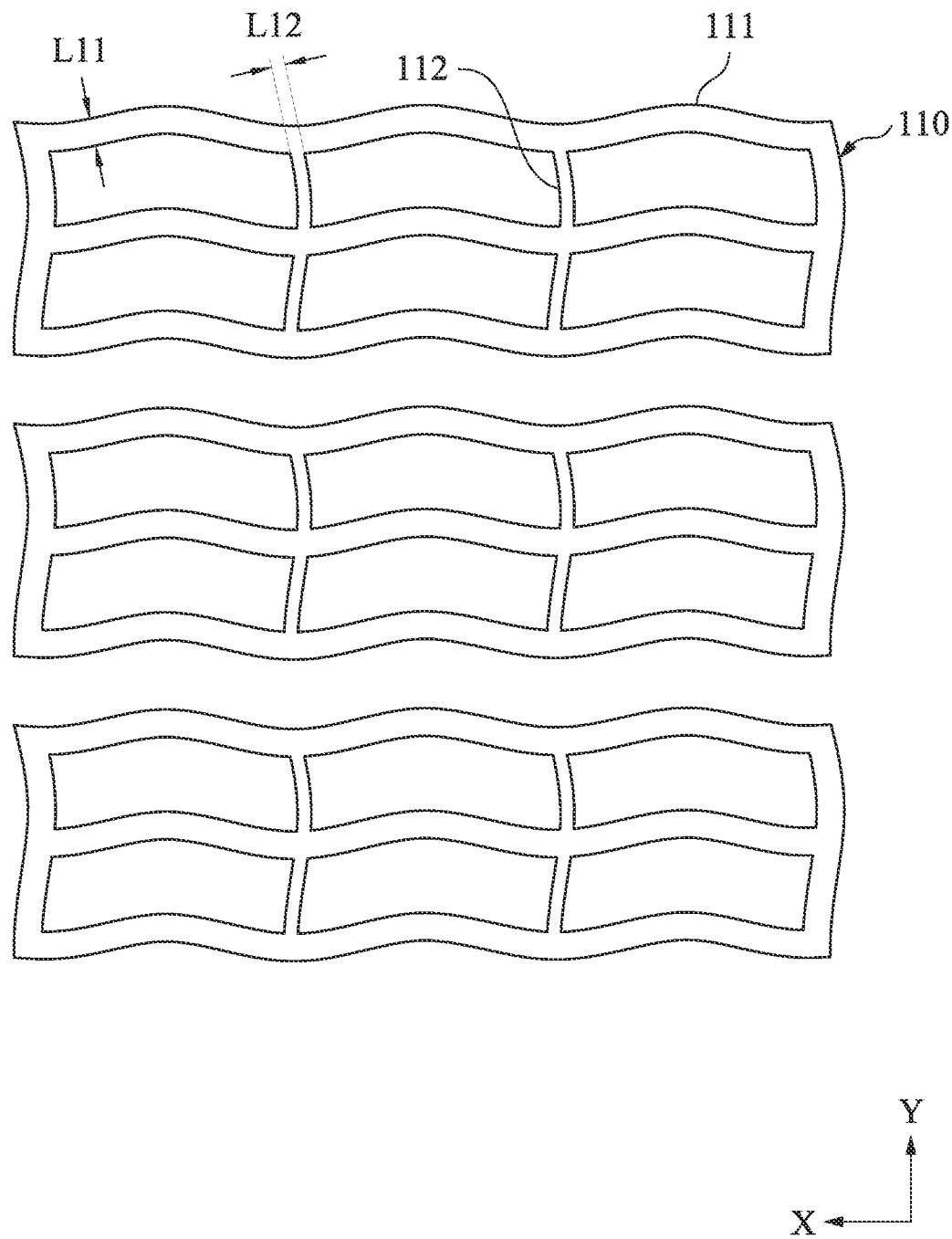
FIG. 2B depicts a schematic view of a first electrode according to another embodiment of the present disclosure.

Please refer to FIG. 1, FIG. 2A, and FIG. 2B. FIG. 2A depicts a schematic view of a first electrode layer 11 according to one embodiment of the present disclosure. The first electrode layer 11 includes a plurality of first electrodes 110. Each of the first electrodes 110 includes a plurality of first electrode wires 111 and a plurality of first axis wires 112. The first electrode wires 111 are formed in a first direction (for example X-axis direction) and connected to each other in parallel. More particularly, the first electrode wires 111 extend (i.e., are disposed) along the first direction and spaced apart from each other along a second direction (for example Y-axis direction), in which the first direction and the second direction are perpendicular to each other. For example, each of the first electrodes 110 consists of three of the first electrode wires 111 connected to each other in parallel. In other embodiments, each of the first electrodes 110 can also consist of two or a plurality of first electrode wires 111, which should not limit the present disclosure. Furthermore, the first electrodes 110 are, for example, connected to each other in parallel with head ends and tail ends of the first electrodes wires 111, and the first electrode wires 111 are long strip-shaped electrode wires with a sinusoidal waveform in a top view.

It should be noted that the first direction refers to the generalized X-axis direction, and the second direction refers to the generalized Y-axis direction; thus, the extending direction of the long strip-shaped electrode wires with the sine waveform can be determined by the direction of the centerlines.

In the first electrode 110, the first axis wires 112 are connected to the first electrode wires 111 and formed in the second direction. It should be emphasized that the breakage or damage of the first electrode wires 111 will cause the circuit impedance to increase and the signal attenuation to increase. As the number of first axis wires 112 increases appropriately, the aforementioned situation can be reduced. In some embodiments, such as illustrated in FIG. 1, from a projection in a vertical direction of the first electrode layer 11 and the second electrode layer 12, the first axis wires 112 are oppositely disposed between two adjacent second electrodes 120 and do not overlap with the second electrodes 120.

In some embodiments, the positions where the first axis wires 112 are connected to the first electrode wires 111 can flexibly include multiple connection aspects, which may be based on the purpose of impedance reduction of the specific electrode wires. In one embodiment, such as illustrated in FIG. 2A, every first axis wire 112 of each of the first electrodes 110 is connected to all of the first electrode wires 111 connected to each other in parallel. In another embodiment, it is assumed that a first electrode 110 consists of three of the first electrode wires 111 connected to each other in parallel, and each of the first axis wires 112 is connected to only two adjacent first electrode wires 111 connected to each other in parallel simultaneously, in which the two adjacent first axis wires 112 are connected to two different first electrode wires 111 for being arranged at interactive intervals That is, the first axis wires 112 are interactively disposed in order that the first (for example, counted from the left in the perspective of FIG. 2A) of the first axis wires 112 is connected to the first and the second (for example, counted from the top in the perspective of FIG. 2A) of the first electrode wires 111 of the first electrode 110, and the second of the second axis wires 122 are connected to the second and third of the first electrode wires 111. Of course, if the sensor uniformity is considered in the design, it would be a better design if each of the first axis wire 112 is connected to all of the first electrode wires 111 connected to each other in parallel simultaneously.

In some embodiments, two adjacent first electrode wires 111 of each of the first electrodes 110 are separated from each other by a first predetermined distance in the second direction. Specifically, two adjacent first electrode wires 111 are separated from each other by 900 µm to 1600 µm.

In some embodiments, a wire width L11 of the first electrode wires 111 and a wire width L12 of the first axis wires 112 are from 100 µm to 800 µm, which can be adjusted according to the application requirement. The wire width L11 or the wire width L12 is, for example, about 100 µm, about 200 µm, about 300 µm, about 400 µm, about 500 µm, about 600 µm, about 700 µm, about 800 µm, or any value between any two of these values. In one embodiment, the wire width L11 and the wire width L12 is between about 200 µm, about 220 µm, about 240 µm, about 260 µm, about 280 µm, about 280 µm, about 300 µm, about 320 µm, about 340 µm, about 360 µm, about 380 µm, about 400 µm, or any value between any two of these values. In some embodiments, the wire widths of the first electrode wires 111 and the first axis wires 112 may be identical (please refer to FIG. 2A) or different. For example, the wire width L12 of the first axis wires 112 may be narrower than the wire width L11 of the first electrode wires 111 (please refer to FIG. 2B).

It is further explained that the first electrode layer 11 of the present disclosure is different from the traditional electrode pattern that has thin-wire width and opaque metal mesh because the first electrode layer 11 of the present disclosure is designed with a material of metal nanowires with high light transmittance. Thus, the wire width L11 of the first electrode wire 111 can be designed to be relatively wider to obtain a better signal transmission effect, and the first electrode wire 111 is not required to be limited to the position of the pixel definition frame (such as the black matrix) of the paired display module (not shown in figures), so that the design flexibility can be increased.

Figure 3A:
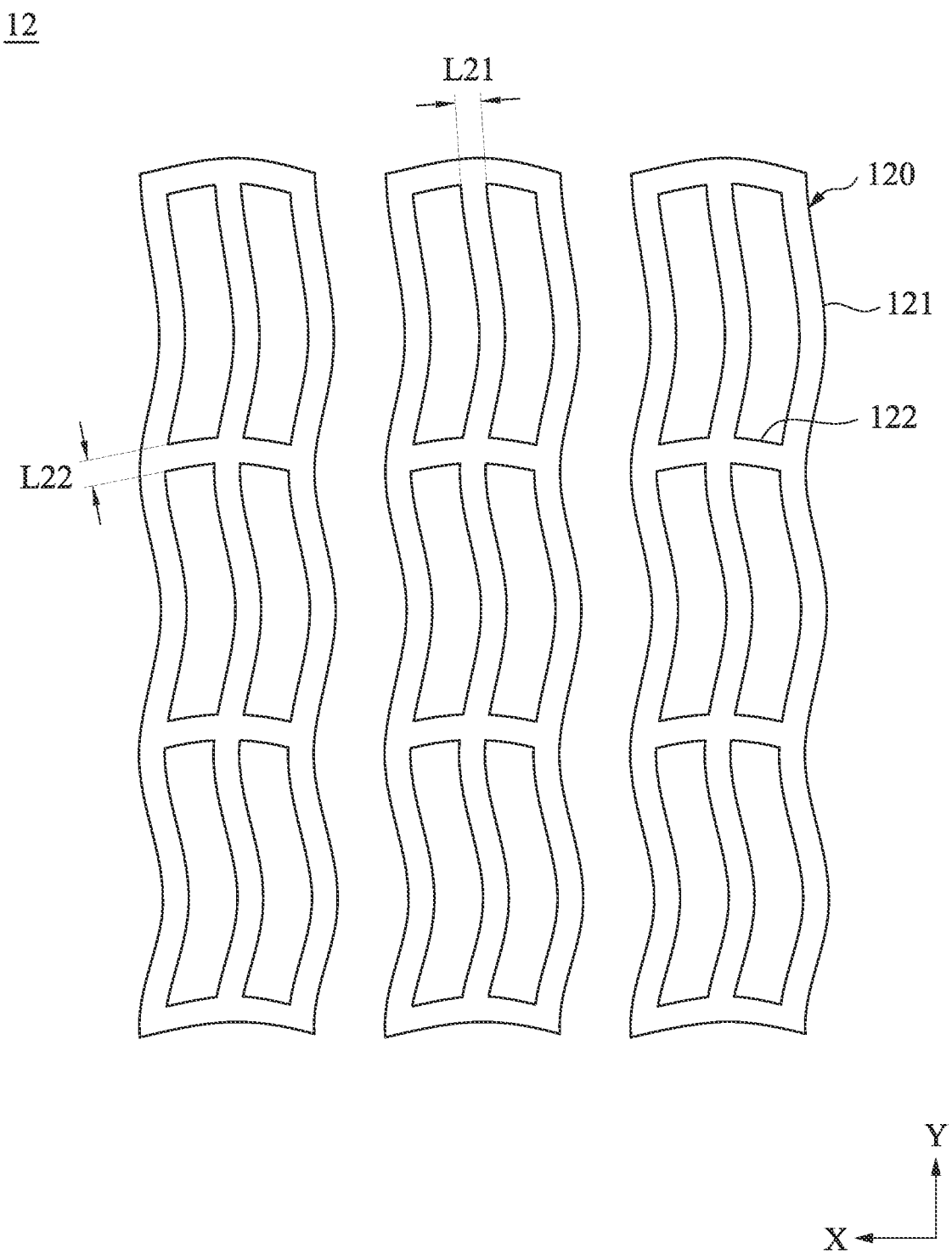
FIG. 3A depicts a schematic view of a first electrode according to one embodiment of the present disclosure.
Figure 3B:
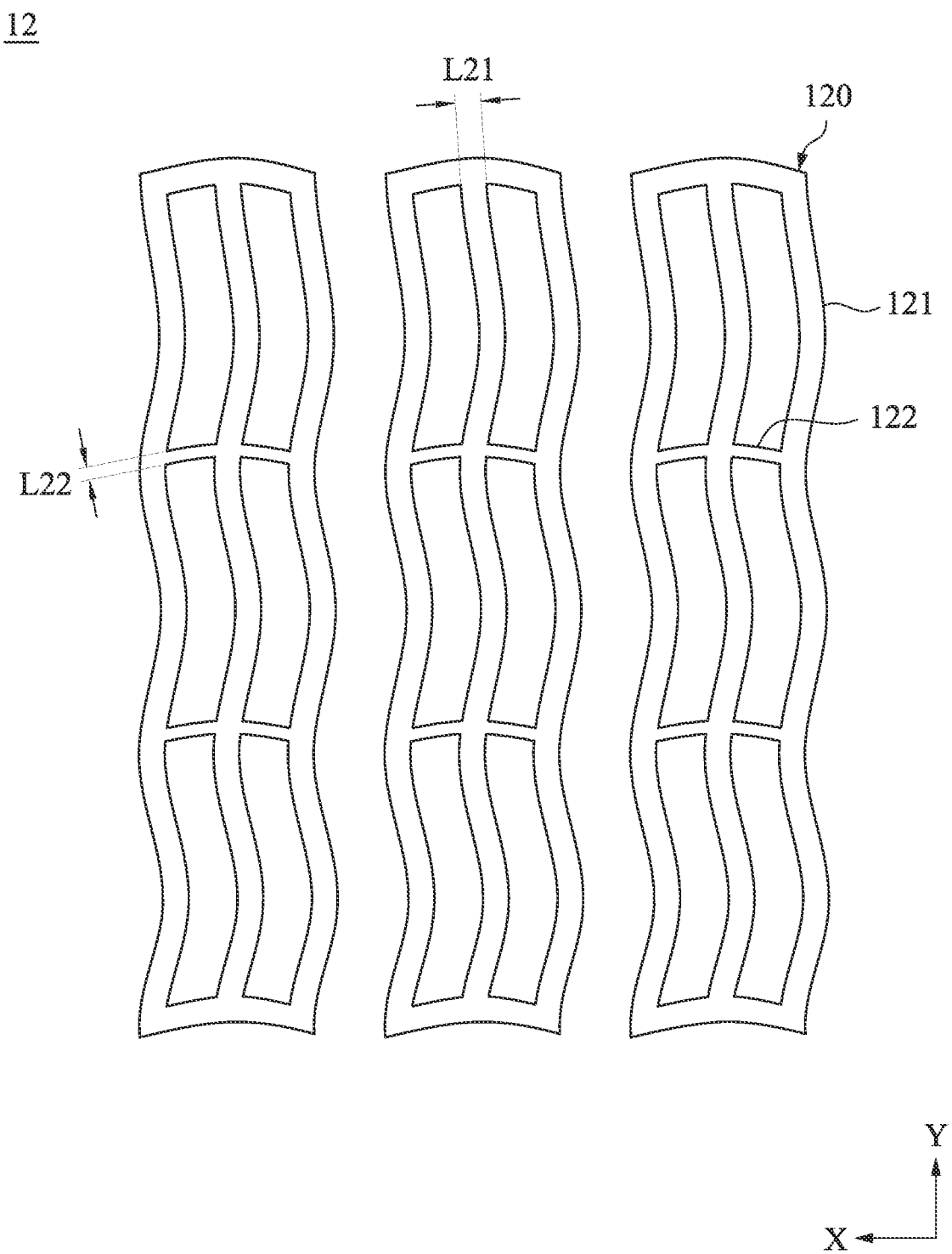
FIG. 3B depicts a schematic view of a first electrode according to another embodiment of the present disclosure.

Please refer to FIG. 1, FIG. 3A, and FIG. 3B. FIG. 3B depicts a schematic view of a second electrode layer 12 according to one embodiment of the present disclosure. The design of the second electrode layer 12 is substantially the same as the design of the first electrode layer 11 described above. The difference is that the first electrode layer 11 is, for example, an electrode used as the X-axis direction electrode, while the second electrode layer 12 of this embodiment is an electrode used as the Y-axis direction electrode.

The second electrode layer 12 includes a plurality of second electrodes 120. Each of the second electrodes 120 includes a plurality of second electrode wires 121 and a plurality of second axis wires 122. The second electrode wires 121 are formed in a second direction (for example Y-axis direction) and connected to each other in parallel. More particularly, the second electrode wires 121 extend (i.e., are disposed) along the second direction and spaced apart from each other along a first direction (for example X-axis direction). For example, each of the second electrodes 120 consists of three of the second electrode wires 121 connected to each other in parallel. In other embodiments, each of the second electrodes 120 can also consist of two or a plurality of second electrode wires 121, which should not limit the present disclosure. Furthermore, the second electrodes 120 are, for example, connected to each other in parallel with head ends and tail ends of the second electrode wires 121, and the second electrode wires 121 are long strip-shaped electrode wires with a sinusoidal waveform in a top view.

In the second electrode 120, the second axis wires 122 are connected to the second electrode wires 121 and formed in the first direction. Similarly, the number of the second axis wires 122 can be appropriately increased in consideration of the requirements of avoiding signal attenuation, the capacitance value of the second electrodes 120, the optical characteristics of the touch panel, and the like. In some embodiments, such as illustrated in FIG. 1, from a projection in a vertical direction of the first electrode layer 11 and the second electrode layer 12, the second axis wires 122 are oppositely disposed between two adjacent first electrodes 110 and do not overlap with the first electrodes 110.

In some embodiments, the positions where the second axis wires 122 are connected to the second electrode wires 121 can flexibly include multiple connection aspects, which may be based on the purpose of impedance reduction of the specific electrode wires. In one embodiment, such as illustrated in FIG. 3A, every second axis wire 122 of each of the second electrodes 120 is connected to all of the second electrode wires 121 connected to each other in parallel. In another embodiment, it is assumed that a second electrode 120 consists of three of the second electrode wires 121 connected to each other in parallel, and each of the second axis wires 122 is connected to only two adjacent second electrode wires 121 connected to each other in parallel simultaneously, in which the two adjacent second axis wires 122 are connected to two different second electrode wires 121 for being arranged at interactive intervals. That is, the second axis wires 122 are interactively disposed in order that the first (for example, counted from the left in the perspective of FIG. 3A) of the second axis wires 122 is connected to the first and the second (for example, counted from the top in the perspective of FIG. 3A) of the second electrode wires 121 of the second electrode 120, and the second of the second axis wires 122 are connected to the second and the third of the second electrode wires 121. Of course, if the sensor uniformity is considered in the design, it would be a better design if each of the second axis wire 122 is connected to all of the second electrode wires 121 connected to each other in parallel simultaneously.

In some embodiments, two adjacent second electrode wires 121 of each of the second electrodes 120 are separated from each other by a second predetermined distance in the second direction. Specifically, two adjacent second electrode wires 121 are separated from each other by 900 μm to 1600 μm.

In some embodiments, a wire width L21 of the second electrode wires 121 and a wire width L22 of the second axis wires 122 are from 100 μm to 800 μm, which can be adjusted according to the application requirement. The wire width L21 or the wire width L22 is, for example, about 100 μm, about 200 μm, about 300 μm, about 400 μm, about 500 μm, about 600 μm, about 700 μm, about 800 μm, or any value between any two of these values. In one embodiment, the wire width L21 or the wire width L22 is between about 200 μm, about 220 μm, about 240 μm, about 260 μm, about 280 μm, about 280 μm, about 300 μm, about 320 μm, about 340 μm, about 360 μm, about 380 μm, about 400 μm, or any value between any two of these values. In some embodiments, the wire widths of the second electrode wires 121 and the second axis wires 122 may be identical (please refer to FIG. 3A) or different. For example, the wire width L22 of the second axis wires 122 may be narrower than the wire width L21 of the second electrode wires 121 (please refer to FIG. 3B).

Similarly, the second electrode layer 12 of the present disclosure is different from the traditional electrode pattern that has thin-wire width and opaque metal mesh because the second electrode layer 12 of the present disclosure is designed with a material of metal nanowires with high light transmittance. Thus, the wire width L22 of the second electrode wire 121 can be designed to be relatively wider to obtain a better signal transmission effect, and the second electrode wire 121 is not required to be limited to the position of the pixel definition frame (such as the black matrix) of the paired display module (not shown in figures), so that the design flexibility can be increased.

Figure 4:
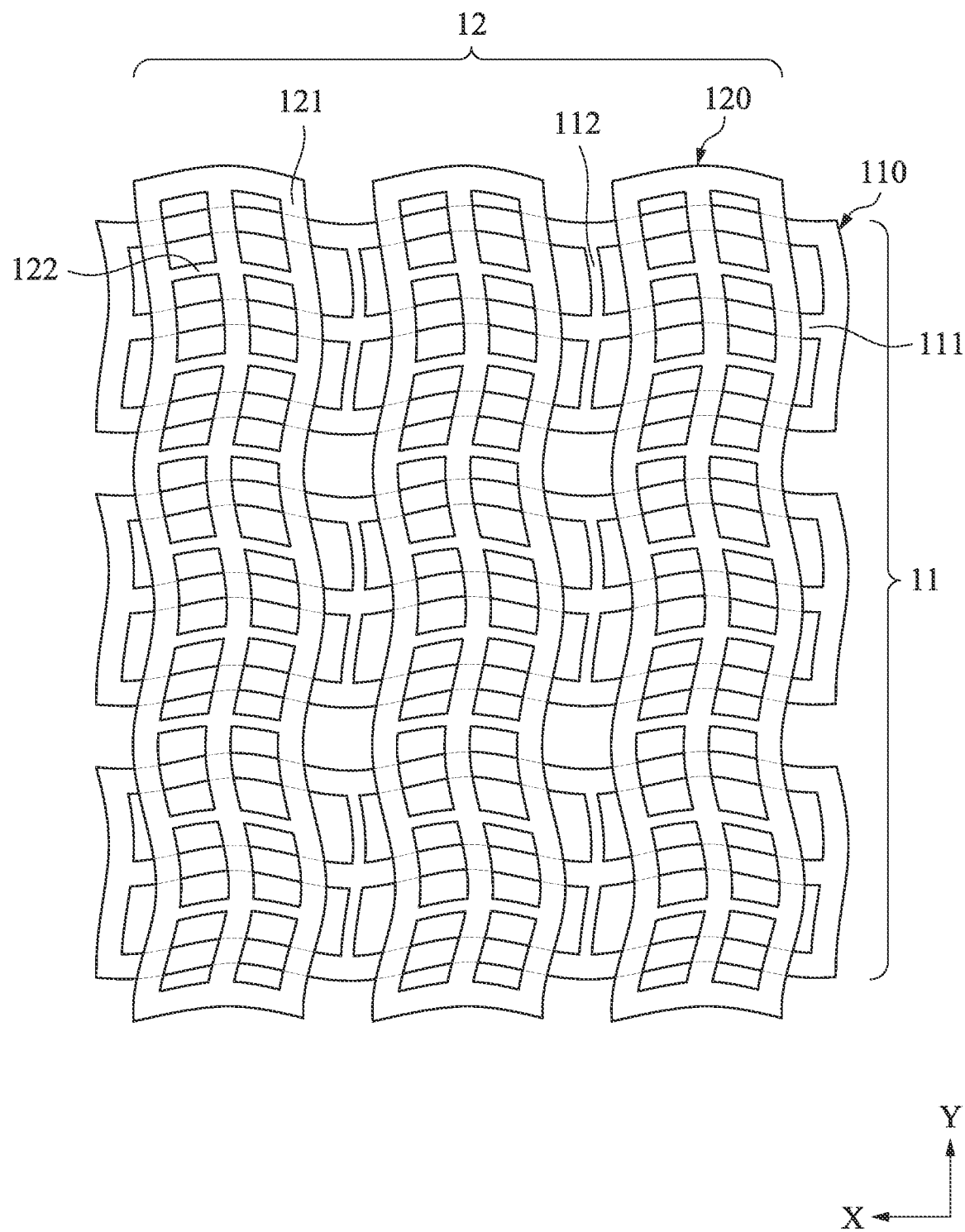
FIG. 4 depicts a front view of a touch electrode according to another embodiment of the present disclosure.

In some embodiments, the amount and the position of the first axis wires 112 and the second axis wires 122 can be selectively disposed according to the requirements. For example, the amount of specific axis wires of the electrodes can be appropriately increased, thereby improving the stability and durability of the electrodes. In some embodiments, the touch electrode 100 is designed to include the first axis wires 112 only in the first electrode layer 11. In some embodiments, the touch electrode 100 is designed to include the second axis wires 122 only in the second electrode layer 12. In some embodiments, the touch electrode 100 is designed to include the first axis wires 112 in the first electrode layer 11 and the second axis wires 122 in the second electrode layer 12, such as illustrated in FIG. 1. Moreover, in some embodiments, more axis wires can also be added to the specific electrode layer according to the requirements in addition to the design of the disposition positions of the first axis wires 112 and the second axis wires 122 as illustrated in FIG. 1, such as illustrated FIG. 4, in which more second axis wires 122 are disposed in the second electrode layer 12. From a projection in a vertical direction of the first electrode layer 11 and the second electrode layer 12, the second axis wires 122 are oppositely disposed between two adjacent first electrode wires 111 and do not overlap with the first electrodes 110 (the first electrode wires 111).

Figure 5:
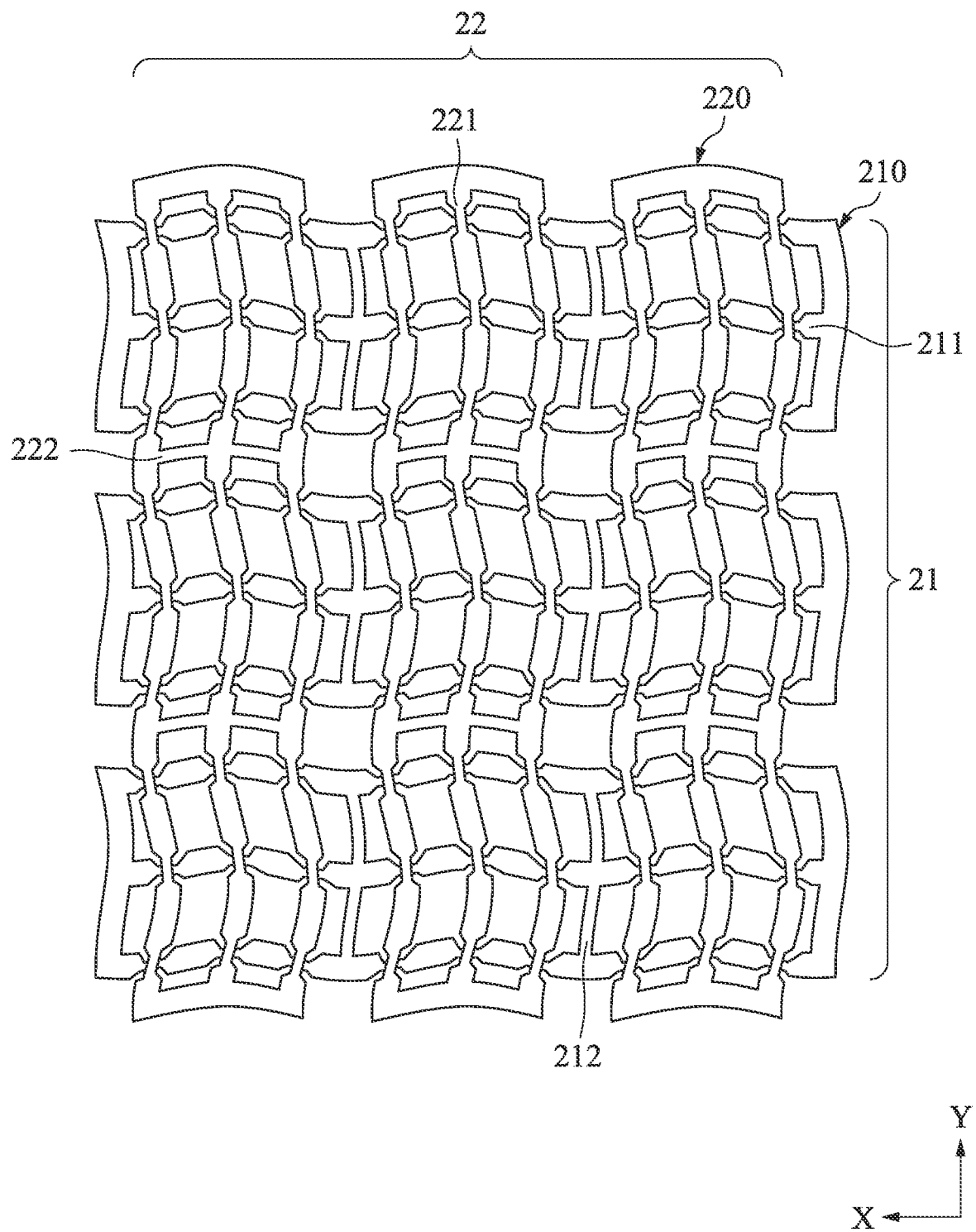
FIG. 5 depicts a front view of a touch electrode according to another embodiment of the present disclosure.

Please refer to FIG. 5. FIG. 5 depicts a front view of a touch electrode according to another embodiment of the present disclosure. The touch electrode 200 of this embodiment is generally the same as the touch electrode 100 illustrated in the embodiment of FIG. 1, in which the structural design that two electrode layers of the first electrode layer 21 and the second electrode layer 22 are similar, and the difference is that the wire widths of a vertical projection area at an intersection of the first electrodes 210 and the second electrodes 220 of this embodiment are designed to be reduced wire widths. More specifically, the wire widths of the vertical projection area at the intersection of each of the first electrode wires 211 in the first electrodes 210 and each of the second electrode wires 221 in the second electrodes 220 are narrower than the original first electrode wires 211 themselves. Similarly, the wire widths of the vertical projection area at the intersection of each of the second electrode wires 221 in the second electrodes 220 and each of the first electrode wires 211 in the first electrodes 210 are narrower than the original second electrode wires 221 themselves.

In one embodiment, the intent of the wire width reduction is to reduce the wire width by about ½ of the wire width at the maximum, for example, the wire width can be reduced by about ½, ⅓, or ¼ of the wire width. If the wire width of the electrode wires is 400 μm, the intent of the wire width reduction at the intersection is to reduce the wire width to 200 μm (reduced by ½), 300 μm (reduced by ¼), and the like. The actual reduced wire width can be adjusted according to actual design requirements and is not limited in the present disclosure.

According to the overall structure of the touch panel (touch sensor) to which the touch electrodes 100 are applied, an insulation layer is also included between the first electrode layer 11 and the second electrode layer 12 to achieve electrical insulation. In some embodiments, the insulation layer can be achieved by being made of a substrate, an insulation coating, or an adhesive layer and is not limited to only one layer, but can also be a multilayer or a composite layer, so that the first electrode layer 11 and the second electrode layer 12 are respectively located on two opposite surface sides of the insulation layer for electrical insulation. In some embodiments, the substrate, for example, serves as the insulation layer, and the first electrode layer 11 and the second electrode layer 12 are respectively arranged on two opposite surface sides of the substrate, thereby forming a laminated substrate formed by a single substrate with double-side electrodes as a whole. In some embodiments, the insulation coating, for example, serves as the insulation layer, and the first electrode layer 11 is first disposed on the surface of the substrate, then, the insulation coating is disposed on the surface of the first electrode layer 11, and finally, the second electrode layer 12 is disposed on the surface of the insulation coating, thereby forming a laminated substrate formed by a single substrate with double-side electrodes as a whole. In some embodiments, the adhesive layer, for example, serves as the insulation layer, and the first electrode layer 11 and the second electrode layer 12 are separately formed on a carrier substrate and then attached by an adhesive layer, thereby forming a laminated substrate formed by a single substrate with double-side electrodes as a whole.

In some embodiments, the touch panel can be further applied to the display module to form a touch display. In actual application, the touch panel can be attached to the display module through optically clear adhesive (OCA). In other embodiments, the touch panel can be integrated into the display module for using the laminated substrates in the display module (for example display substrates, polarizers, protective substrates, or the like) to be the carrier layer of the first electrode layer 11 and the second electrode layer 12.

In some embodiments, the substrate may be a flexible transparent substrate for achieving the bendable and flexible efficiency, and the material of the substrate may be selected from polyvinyl chloride (PVC), polypropylene (PP), polyethylene terephthalate (PET), polyethylene naphthalate (PEN), polycarbonate (PC), polystyrene (PS), polyimide (PI), cyclo-olefin polymers (COP), or other transparent materials.

Next, the specific manufacturing methods of the first electrode layer 11 and the second electrode layer 12 are further described in the following. The manufacturing method of the two layers are the same, and only the first electrode layer 11 will be used as a representative description below. The first electrode layer 11 is formed by a dispersion solution or slurry including metal nanowires through the steps of coating, drying/molding by curing, patterning, or the like.

The steps of the above-mentioned coating include, for example, but are not limited to, a screen printing, a nozzle coating, a roller coating, or the like. In one example, a roll to roll (RTR) process can be used to coat the dispersion solution or slurry including metal nanowires on a continuously supplied substrate. The above-mentioned dispersion solution including metal nanowires may be water, alcohol, ketone, ether, hydrocarbon, or aromatic solvent (such as benzene, toluene, and xylene). The above-mentioned dispersion solution may also include additives, surfactants, or adhesives, such as carboxymethyl cellulose (CMC), 2-hydroxyethyl cellulose (2-HEC), hydroxypropyl methylcellulose (HPMC), sulfonate, sulfate, disulfonate, sulfosuccinate, phosphate ester, fluorine-containing surfactant, or the like. The above-mentioned first electrode layer 11 (metal nanowires layer), for example, can include a silver nanowires layer, a gold nanowires layer or a copper nanowires layer. In detail, as used herein, "metal nanowires", is a collective term. The metal nanowires refer to a collection of metal wires including multiple elemental metals, metal alloys, or metal compounds (including metal oxides), in which the number of metal nanowires does not affect the claimed scope of the present disclosure, and at least one cross-sectional dimension (i.e., the diameter of the cross-section) of a single metal nanowire is less than about 500 nm, preferably less than about 100 nm, and more preferably less than about 50 nm. The metal nanostructure referred to as a "wire" in the present disclosure has a high aspect ratio, for example, ranging from about 10 to 100,000. More specifically, the aspect ratio (length:diameter of the cross-section) of a metal nanowire may be greater than about 10, preferably greater than about 50, and more preferably greater than about 100. The metal nanowires may be any metal, including (but not limited to) silver, gold, copper, nickel, and gold-plated silver. Other terms such as silk, fiber, tube, or the like, which also have the above-mentioned sizes and high aspect ratios, are also covered by the scope of the present disclosure.

In some embodiments, the metal nanowires may be silver nanowires or silver nanofibers, which may have an average diameter of about 20 nm to 100 nm and an average length of about 20 nm to 100 μm. Preferably, the average diameter is about 20 nm to 70 nm, and the average length is about 20 to 70 microns (that is, the aspect ratio is 1000). In some embodiments, the diameter of the metal nanowires can be from 70 nm to 80 nm, and the length of which is about 8 μm.

The above-mentioned curing/drying step is mainly directed to volatilizing the substances of solvents or the like, and the metal nanowires are randomly distributed on the surface of the substrate. Preferably, the metal nanowires are secured on the surface of the substrate without falling off and form the foregoing first electrode layer 11. Moreover, the metal nanowires can contact each other to provide a continuous current path, thereby forming a conductive network.

In addition, in some embodiments, an overcoat (not shown in figures) can be disposed in the first electrode layer 11 (metal nanowires layer), and after curing, the overcoat and the first electrode layer 11 are formed to be a composite structure layer. In one embodiment, a suitable polymer or the mixture of the polymers can be formed on the first electrode layer 11 by a coating method, and the above-mentioned polymer can penetrate between the metal nanowires to form a filler and then form an overcoat through the curing step. In other words, metal nanowires can be regarded as being embedded into the overcoat. In one specific embodiment, the curing step includes: forming the overcoat on the first electrode layer 11 with the above-mentioned polymer and the mixture of the polymers using the method of heating and baking (the temperature can be from about 60° C. to about 150° C.). The physical structure between the overcoat and the first electrode layer 11 does not limit the present disclosure. For example, the overcoat and the first electrode layer 11 can be a two-layer structure stack, or the overcoat and the first electrode layer 11 can be combined with each other to form a composite layer. Preferably, the metal nanowires are embedded into the overcoat to form a composite layer and patterned in the subsequent manufacture process.

Preferably, the foregoing polymers can provide the metal nanowires certain specific chemical, mechanical, and optical properties. For example, adhesion between the metal nanowires and the substrate or better physical-mechanical strength is provided, so that the overcoat can also be referred to as a matrix. On the other hand, some specific polymers may be used to make the overcoat, so that metal nanowires have additional surface protection against scratches and abrasion. The polymers, such as polyacrylate, epoxy resin, polyurethane, polysilane, polysiloxane, poly (silicon-acrylic acid), or the like, can provide metal nanowires with higher surface strength and improved scratch resistance. Furthermore, cross-linking agents, polymerization inhibitors, stabilizers (for example, but not limited to antioxidants, ultraviolet (UV) stabilizers), surfactants, or the above-mentioned analogs or mixtures can be added to the aforementioned polymers to improve the UV resistance of the composite structure or to achieve a longer shelf life of the composite structure.

In some embodiments, the foregoing metal nanowires can be further subjected to post-treatment to increase their conductivity. The post-treatment includes, but is not limited to, process steps such as heating, plasma, corona discharge, ultraviolet light, ozone, or pressure. For example, after the curing step to form the first electrode layer 11, a roller can be used to apply pressure on metal nanowires. In one example, the pressure of 50 to 3400 psi is applied to the metal nanowires layer by one or more rollers; preferably, the pressure of 100 to 1000 psi, 200 to 800 psi, or 300 to 500 psi may be applied. In some embodiments, the post-treatment of heating and pressure can be performed simultaneously. In detail, the formed metal nanowires can be applied with pressure by one or more rollers as described above and heated at the same time. For example, the pressure applied by the roller is 10 to 500 psi, preferably 40 to 100 psi, and at the same time, the roller is heated to about 70° C. to 200° C., preferably about 100° C. to 175° C., which can increase the conductivity of the first electrode layer 11. In some embodiments, the metal nanowires are preferably exposed to a reducing agent for post-treatment. For example, the metal nanowires including nano silver wires are preferably exposed to a silver reducing agent for post-treatment. The silver reducing agent includes borohydride such as sodium borohydride, boron nitrogen compounds such as dimethylamino benzaldehyde (DMAB), or gas reducing agents such as hydrogen ($H_2$). The exposure time is about 10 seconds to about 30 minutes, preferably about 1 minute to about 10 minutes. The above steps of applying pressure can be added in appropriate steps according to actual requirements.

Finally, the patterning step, for example, performs exposure/development (i.e., a well-known lithography process) and etching on the cured first electrode layer 11 to produce the pattern of the first electrode 110. In one embodiment, the first electrode layer 11 preferably has the following characteristics: a transmission of visible light (for example, the wavelength is from about 400 nm to 700 nm) may be greater than about 80%, and the surface resistance is from about 10 to 1000 ohm/square. Preferably, the visible light (for example, the wavelength is from about 400 nm to 700 nm) of the nanowires layer has a transmission greater than about 85%, and the surface resistance is from about 50 to 500 ohm/square.

In the touch electrode of the present disclosure, the metal nanowires serve as the materials of the electrodes and axis lines, which can avoid the reflection and Moiré effects that are desired to be avoided by the conventional use of metal meshes and increase the flexibility of the wire design. In addition, the design of axis lines increases the branches between the electrode wires connected to each other in parallel, which is beneficial to reduce the impedance change caused by the broken or damaged electrode wires connected to each other in parallel and improve the stability and durability of the touch electrode.

While the disclosure has been described by way of example(s) and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch electrode, comprising:
   a first electrode layer, comprising a plurality of first electrodes, wherein each of the first electrodes comprises a plurality of first electrode wires and a plurality of first axis wires, wherein the first electrode wires extend along a first direction, are spaced apart from each other along a second direction and are connected to each other in parallel, wherein the first axis wires extend along a second direction and are spaced apart from each other along the first direction, wherein each of the first axis wires is connected to the first electrode wires, wherein the first direction and the second direction are perpendicular to each other; and
   a second electrode layer, electrically insulated and located above or beneath the first electrode layer, wherein the second electrode layer comprises a plurality of second electrodes, wherein each of the second electrodes comprises a plurality of second electrode wires, wherein the second electrode wires extend along the second direction, are spaced apart from each other along the first direction, and are connected to each other in parallel, wherein a material of the first electrode layer and the second electrode layer is metal nanowires, and the first electrode wires and the second electrode wires are strip-shaped electrode wires with a sinusoidal waveform.

2. The touch electrode of claim 1, wherein, from a projection in a vertical direction of the first electrode layer and the second electrode layer, the first axis wires are oppositely disposed between two adjacent second electrodes of the second electrodes.

3. The touch electrode of claim 2, wherein, from the projection in the vertical direction of the first electrode layer and the second electrode layer, the first axis wires are oppositely disposed between two adjacent second electrode wires of the second electrode wires.

4. The touch electrode of claim 1, wherein each of the first electrodes comprises three of the first electrode wires connected to each other in parallel, and each of the second electrodes comprises three of the second electrode wires connected to each other in parallel.

5. The touch electrode of claim 1, wherein in each of the first electrodes, each of the first axis wires is connected to all or a portion of the first electrode wires connected to each other in parallel.

6. The touch electrode of claim 1, wherein wire widths of the first electrode wires and the first axis wires are from 100 μm to 800 μm, and two adjacent first electrode wires of the first electrode wires are separated from each other by 900 μm to 1600 μm.

7. The touch electrode of claim 1, wherein each of the second electrodes further comprises a plurality of second axis wires, wherein the second axis wires extend along the first direction and are spaced apart from each other along the second direction, wherein each of the second axis wires is connected to the second electrode wires.

8. The touch electrode of claim 7, wherein, from a projection in a vertical direction of the first electrode layer and the second electrode layer, the second axis wires are oppositely disposed between two adjacent first electrodes of the first electrodes.

9. The touch electrode of claim 8, wherein, from the projection in the vertical direction of the first electrode layer and the second electrode layer, the second axis wires are oppositely disposed between two adjacent first electrode wires of the first electrode wires.

10. The touch electrode of claim 7, wherein in each of the second electrodes, each of the second axis wires is connected to all or a portion of the second electrode wires connected to each other in parallel.

11. The touch electrode of claim 7, wherein wire widths of the second electrode wires and the second axis wires are from 100 μm to 800 μm, and two adjacent second electrode wires of the second electrode wires are separated from each other by 900 μm to 1600 μm.

12. The touch electrode of claim 1, wherein wire widths of a vertical projection area at an intersection of the first electrodes and the second electrodes are less than wire widths of the first electrodes and the second electrodes at non-intersection areas.

13. A touch panel, comprising:
a first substrate; and
the touch electrode as claimed in claim 1,
wherein the first electrode layer is disposed on a first surface of the first substrate.

14. The touch panel of claim 13, wherein the second electrode layer is disposed on a second surface of the first substrate opposite to the first surface of the first substrate.

15. The touch panel of claim 13, further comprising an insulation coating, wherein the insulation coating is disposed on the first electrode layer, and the second electrode layer is disposed on the insulation coating.

16. The touch panel of claim 13, further comprising an adhesive layer and a second substrate, wherein the second electrode layer is disposed on a surface of the second substrate, and the first substrate on which the first electrode layer is disposed and the second substrate on which the second electrode layer is disposed are attached to each other by the adhesive layer.

17. The touch panel of claim 13, further comprising an optical adhesive layer, wherein the first substrate is attached to a display module by the optical adhesive layer.

18. A touch display, comprising:
a display module, comprising at least one carrier substrate; and
the touch electrode as claimed in claim 1,
wherein the first electrode layer and the second electrode layer are disposed on the at least one carrier substrate.

19. The touch display of claim 18, wherein the at least one carrier substrate comprises any one of a display substrate, a polarizer, a protective substrate, and an adhesive layer.

* * * * *